June 28, 1966　　　G. H. PREECE　　　3,257,868

EPICYCLIC CHANGE-SPEED GEAR MECHANISMS

Filed Feb. 8, 1963　　　2 Sheets-Sheet 2

INVENTOR:

United States Patent Office 3,257,868
Patented June 28, 1966

3,257,868
EPICYCLIC CHANGE-SPEED GEAR MECHANISMS
Gordon Herbert Preece, Mapperley Plains, Nottingham, England, assignor to Raleigh Industries Limited, a company of Great Britain, Northern Ireland, and the Isle of Man
Filed Feb. 8, 1963, Ser. No. 257,151
Claims priority, application Great Britain, Mar. 29, 1962, 11,990/62
8 Claims. (Cl. 74—750)

The invention concerns epicyclic change-speed gear assemblies, and in particular relates to such assemblies having a back-pedal brake arrangement incorporated therein.

Epicyclic change-speed gear assemblies for cycles are known in which the motion of a driver is selectively transmitted to a planet cage or to an annulus by means of a selector means, the motion of such planet cage or annulus being utilised to provide an output drive to a wheel hub.

Conventional epicyclic change-speed gear assemblies of this character frequently incorporate a back-pedal brake arrangement, but such assemblies, hereinafter referred to as "change-speed gear assemblies of the kind specified," do possess certain disadvantages. For example, it is possible in certain circumstances for the assembly to be so adjusted, for instance when the gear selection mechanism is between high and normal gear setting, that no braking action results from applying a back pressure to the driving pedals. In this case there would be no forward drive through the assembly either. A similar effect might be had if the assembly were in maladjustment.

A further unsatisfactory feature lies in the fact that the braking action at any given instant is determined by the gear setting selected, being greater in normal and low gear setting than in high gear setting.

It is among the objects of the present invention to provide a change-speed gear assembly of the kind specified which does not possess the unsatisfactory features before referred to. That is to say, to provide a gear assembly which does not possess the feature of loss of braking when between gears and reduction of braking power in high gear.

Thus according to the present invention a change-speed gear assembly of the kind specified is characterised by the provision of a brake actuating mechanism adapted to apply a reverse motion to the annulus thereby to effect brake engagement, the said mechanism including a pawl and ratchet means wherein the pawl is adapted to be tripped whilst the assembly is in driving condition, at least in high gear, and by the provision of means adapted to ensure the selector sleeve is drivingly disengaged from the planet cage during braking.

The invention will now be described further, by way of example only, with reference to the accompanying drawings illustrating one embodiment thereof and in which.

Figure 1:
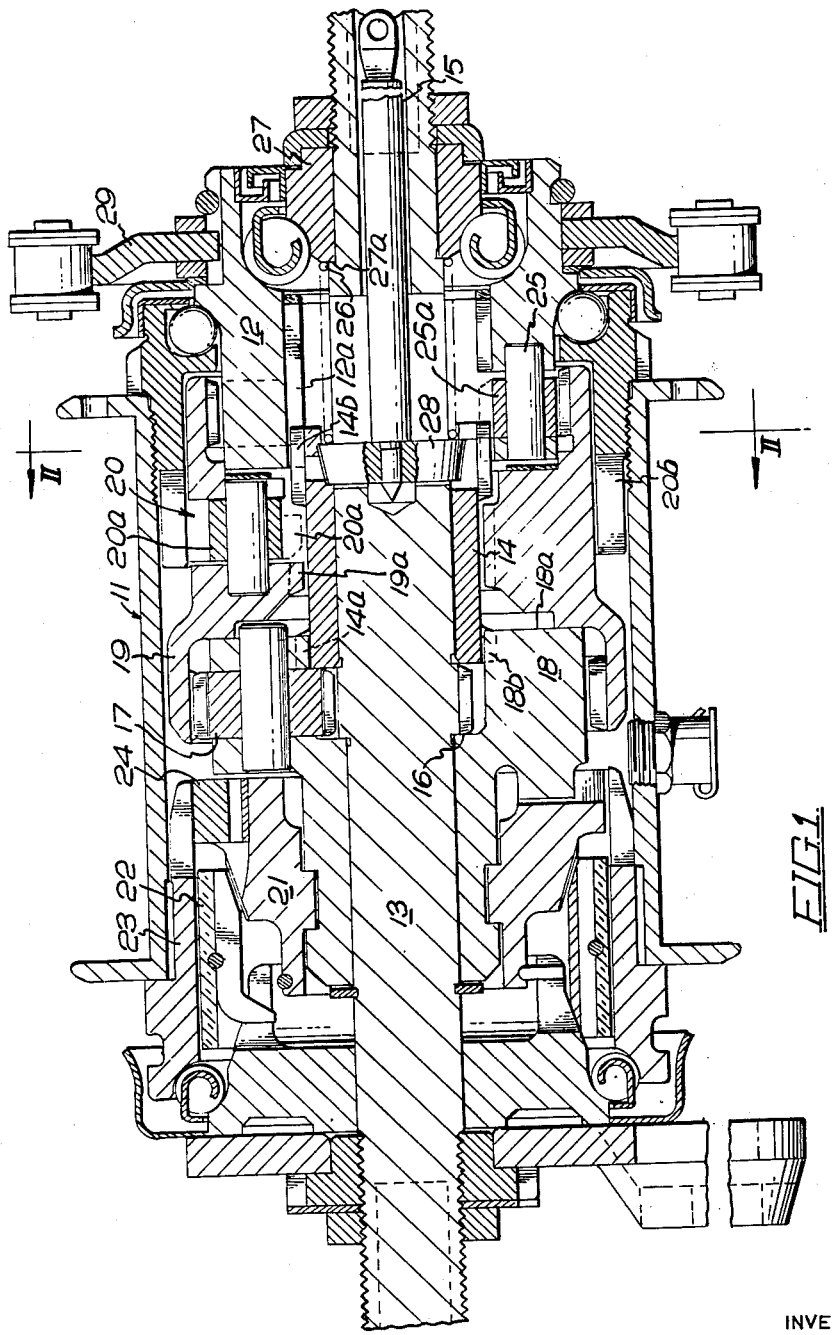
FIG. 1 is a longitudinal section through an epicyclic gear assembly according to the invention.

Referring now to the drawings and particularly to FIG. 1 thereof, a change-speed gear assembly of the kind specified comprises a wheel hub 11 within which are disposed a driver 12 mounted for rotation about the axis of a fixed wheel spindle 13, a selector sleeve 14 mounted upon said spindle 13 and adapted to be actuated axially thereof by a control rod 15, a fixed sun gear 16 on said spindle 13, a multiplicity of planet gears 17 supported in a planet cage 18 and in engagement with said sun gear 16, the said cage 18 being mounted for free rotational motion about the spindle 13, an annulus 19 disposed radially outwardly of the planet gears and having gear teeth at the inner radius thereof in engagement with the planet gears 17, a pawl and ratchet means 20 for high and normal gears between the annulus 19 and the wheel hub 11, and a pawl and ratchet means 24 for low gear between a brake cone 21 in screw-threaded engagement with the planet cage 18 and the wheel hub 11. The brake cone is adapted, upon relative motion between the brake cone 21 and the planet cage 18 in the appropriate direction, to cause a brake lining 22 to move into friction engagement with a brake drum 23 and brake actuating means 25 are provided within the hub 11 whereby the brake cone 21 may be caused so to move, by rotation of the annulus 19 and planet cage 18, as to bring the lining into the said frictional engagement. The selector sleeve 14, whilst being in engagement with the driver 12, may not ncessarily be in engagement with the planet cage 18 or the annulus 19.

The driver 12 has an axially directed through bore and such bore is provided with splines 12a.

The inner bore 18a of the planet cage 18 is provided with a plurality of internal dogs 18b to receive splines 14a formed at the innermost end of the selector sleeve 14, whilst the outermost end of the sleeve is provided with splins 14b to engage the splines 12a formed on the driver.

A return spring 26 is disposed co-axially with the spindle 13 and extends between the nose 27a of a fixed bearing cone 27 and a clutch key 28 in engagement with the selector sleeve.

The operation of the epicyclic gear assembly is conventional, and with the relative disposition of parts shown in FIG. 1, such disposition corresponding to the high gear position, rotation of a chain sprocket 29 connected with the driver 12 in a forward direction will cause the planet cage 18 to be rotated by virtue of the engagement of the selector sleeve 14 with, on the one hand, the driver 12 and, on the other hand, the said cage 18, and thus the annulus 19 will rotate. Rotation of the annulus 19 will, through the pawls 20a in engagement with the ratchet 20b of the pawl and ratchet means 20, impart the desired motion to the hub and thus the drive is effected.

To engage normal or middle gear the selector sleeve 14 is withdrawn until the splines 14a thereof engage dogs 19a on the annulus 19 and in this instance the drive is through the selector sleeve 14 to the annulus 19 and thence to the hub 11 through the pawl and ratchet means 20 as before.

Figure 3A:
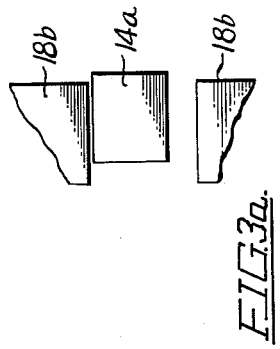
FIG. 3a is a modification of the detail shown in FIGURE 3.

For low gear the selector sleeve 14 is withdrawn further until the splines 14a of the said sleeve abut the tails 20a' of the pawls 20a and trip the said pawls out of engagement with the respective ratchet. In this case the drive is taken through the selector sleeve 14 to the annulus 19 and thence to the planet gears 17. Rotation of the gears 17 about the fixed sun gear 16 causes the planet cage 18 to rotate and the brake cone 21 rotates therewith (FIG. 3a), transmitting motion to the hub 11 through the pawl and ratchet means 24.

When driving in high and normal gears the pawl and ratchet means 24 has been overrunning.

Figure 2:
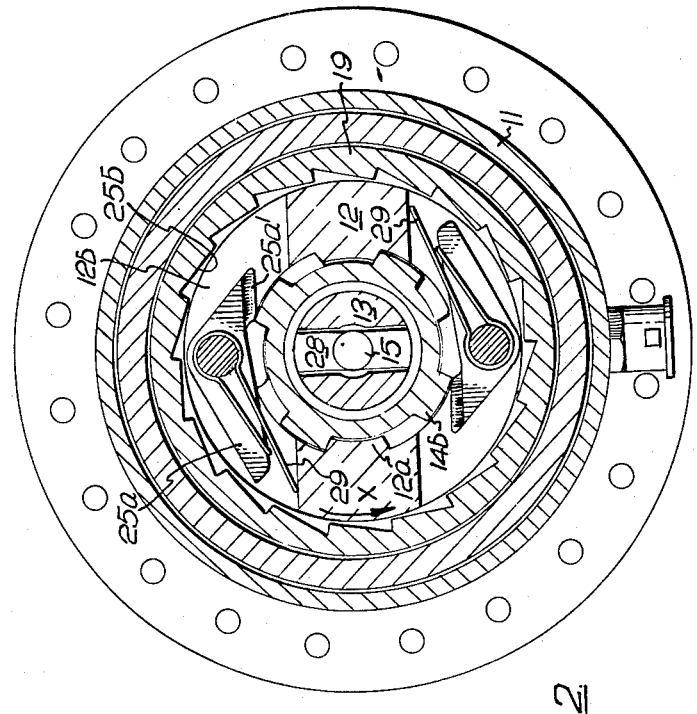
FIG. 2 is a section along line II—II of FIG. 1.

The brake actuating means 25, see now particularly FIG. 2, comprises two pawl members 25a supported by the driver 12 and positioned for engagement with inwardly directed ratchet teeth 25b formed in the annulus 19. The pawls 25a are positioned in slots 12b in the driver 12 and the tails 25a' of the said pawls 25a extend inwardly of such slots 12b in a manner yet to become apparent. A spring 29 is provided in respect of each pawl 25a and serves to urge such pawl into engagement with the ratchet teeth 25b. The tails 25a' of the pawls are chamfered at the inner side thereof.

The disposition of the pawls 25a relative to the driver is such that the splines 14b on the selector sleeve 14 will, in the driving position of such splines 14b relative to the splines 12a in the driver, contact the tails 25a' thereof and trip such pawls out of engagement with the ratchet teeth 25b. Lost motion between the splines 12a, 14b on the driver and selector sleeve respectively will enable the pawls to engage the ratchet teeth upon reverse motion of the driver. It is clear that in practice and when high gear is selected the pawls 25a must be tripped to avoid binding of the assembly in view of the higher rotational speed of the annulus relative to the driver, in a sense corresponding to the driving engagement of the pawls 25a and ratchet teeth 25b.

Figure 3:
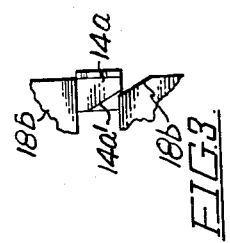
FIG. 3 is a fragmentary detail of part of FIG. 1.

It is also necessary, if the brake is to be satisfactorily applied when high gear is selected that either the splines 14a be disengaged from the internal dogs 18b, that the drive between the splines and the planet carrier is arranged to take place in the normal (forward) direction only, or that the brake engagement be effected before a drive in the reverse direction takes place. The brake will be applied by the action of the annulus 19. The positive disengagement may be effected by providing the splines 14a with an inclined rear face 14a', see FIG. 3, and providing a complementary inclination 18b' in the appropriate side of the internal dogs 18b. Upon reverse motion of the selector sleeve 14 such as would result from the application of the brake, the inclined faces meet and the sleeve 14 is moved axially until the spline moves out of engagement with the dogs 18b. It is possible to insure that the drive between the driver and the carrier takes place only in the forward direction by providing a unidirectional clutch at some position in the transmission from the driver to the carrier, while brake application before reverse motion of the carrier by the sleeve can generally be avoided by providing adequate lost motion, such lost motion being provided by suitably dimensioning the internal dogs 18b and the splines 14a.

The operation of the back pedal brake under all conditions is as follows.

Upon rotation of the driver 12 in the direction of the arrow X in FIG. 2, in all gears and even when the assembly is between high and normal gears, the tail 25a' of the pawl 25a is allowed to move radially inwardly and the pawl engages the ratchet teeth under the action of the spring 29. It may be found convenient in practice to provide a resilient means whereby rotation of the driver 12 in the direction of arrow X relative to the selector sleeve 14 may be effected thus to ensure that the pawls are engaged with the ratchet teeth except when driving.

The application of a reverse pressure on the pedals when the pawls 25a are in engagement with the ratchet teeth 25b will cause the annulus 19 to rotate in the reverse sense, and in turn the planet cage 18 will rotate in a similar manner. The reverse motion of the cage 18 will effect axial displacement of the brake cone 21 and thus the requisite frictional engagement of the brake lining 22 with the brake drum 23 will be obtained.

As has been stated in high gear correct operation of the brake will be obtained by arranging that the selector sleeve is incapable of driving in reverse by reason of the co-operating inclined faces.

The invention is not restricted to the exact details of the embodiment hereinbefore described since alternatives will readily present themselves to one skilled in the art. For example an analogous arrangement may be provided in respect of other than three speed gears.

I claim:

1. A change-speed gear assembly comprising a hub shell, a fixed sun gear disposed axially of said shell, a planet cage rotatable relative to the said sun gear, a multiplicity of planet gears supported in the planet cage and in engagement with the sun gear, an annulus disposed outwardly of the planet cage, inwardly facing teeth on the annulus in engagement with the planet gears, a brake cone carried by and rotatable relative to the planet cage, unidirectional coupling means between the planet cage and hub shell and between the annulus and the said shell, a selector sleeve for selecting change speed, a brake actuating mechanism adapted to apply a reverse motion to the annulus and thus to the cage to effect relative rotational movement between the cone and cage so as to cause brake engagement, the said mechanism consisting of a pawl and ratchet means and means by which the pawl is disengaged from the ratchet while the assembly is in driving condition, at least in high gear, and means adapted to ensure that the selector sleeve is drivingly disengaged from the planet cage during braking.

2. A change-speed gear assembly as claimed in claim 1 wherein the planet cage has internal bevel-edged dogs thereon adapted to be abutted by beveled radial splines on the selector sleeve, there being an arcuate spacing between the internal dogs in excess of the width of each of the radial splines, the excess constituting a lost-motion.

3. A change-speed gear assembly comprising a hub shell, a fixed sun gear disposed axially of the said shell, a planet cage rotatable relative to the said sun gear, a multiplicity of planet gears supported in the planet cage and in engagement with the sun gear, an annulus disposed outwardly of the planet cage, inwardly facing teeth on the annulus in engagement with the planet gears, a brake cone carried by and rotatable relative to the planet cage, unidirectional coupling means between the planet cage and hub shell and between the annulus and the said shell, a selector sleeve for selecting change speed, a driver adapted to apply a driving motion to the selector sleeve, radial splines on the selector sleeve, cooperating dogs on the planet cage and with which the said splines engage, and a brake actuating mechanism adapted to apply a reverse motion to the annulus thereby to effect brake engagement, the said mechanism comprising a pawl and ratchet means and means whereby each pawl thereof is adapted to be tripped while the assembly is in driving condition, at least in high gear, and means adapted to ensure that the selector sleeve is drivingly disengaged from the planet cage during braking, the radial splines on the selector sleeve having an inclined rear face thereto, and the internal dogs on the planet cage being complementarily formed, thus to effect disengagement of the sleeve from the cage upon relative motion therebetween in the reverse sense.

4. A change-speed gear assembly as claimed in claim 3 wherein the pawl and ratchet means comprises at least one pawl pivotally supported in the driver, a ratchet formed in the annulus and adapted to be engaged by the said pawls, a tail to each said pawl directed inwardly of the assembly, radially outwardly directed splines upon the end of the selector sleeve remote from the planet cage adapted selectively to abut and displace the said tails thus to move each said pawl out of engagement with the said ratchet, a lost-motion being introduced between cooperating drive formations on the driver and sleeve thus to allow engagement of the pawls and associated ratchet upon relative motion between the sleeve and annulus in a sense corresponding to a reverse motion of the driver.

5. A change-speed gear assembly which comprises a fixed spindle, a sun gear on said spindle and secured thereto, a planet cage rotatably mounted upon said spindle, a multiplicity of planet gears supported in said planet cage and in engagement with said sun gear, an annulus mounted coaxially with the spindle and rotatable thereabout, inwardly facing gear teeth on the annulus in engagement with the planet gears, a pawl means supported by the annulus, a ratchet means operatively engageable with the said pawl means, a hub shell to which the ratchet means is secured, a driver mounted coaxially with the spindle and adapted to be rotated by a driving force, internal dogs in an end face of the planet cage, internal splines at the bore of the driver, internal dogs on the annulus, a selector sleeve adapted to be moved axially of the hub thus selectively, by means of radial splines on said sleeve, to connect the driver to the planet cage or the annulus, a brake cone carried by and rotatable relative to the cage and in coarse threaded engagement therewith, a brake lining in axially spaced relationship to the brake cone and adapted to be abutted by such cone upon axial displacement thereof, a ratchet means drivingly connecting the brake cone and the hub, the pawl and ratchet means operatively connecting the hub shell and the annulus being adapted to be tripped by the selector sleeve upon axial movement thereof to a predetermined position, a pawl and ratchet means drivingly connecting the driver and the annulus, such means being adapted to be tripped while the assembly is in driving condition, at least when the selector sleeve is in engagement with the planet cage, the latter said pawl and ratchet means being adapted to apply a reverse motion to the annulus thereby to effect brake engagement.

6. A change-speed gear assembly as claimed in claim 5 wherein the selector sleeve is adapted to be disengaged from the planet cage during braking by the provision of an inclined rear face to each radial spline on the selector sleeve and a complementarily inclined corresponding face to internal dogs on the planet cage.

7. A change-speed gear assembly as claimed in claim 5 wherein the pawls carried by the driver have tails thereto, the tails being so formed and positioned as to be abutted and displaced by radially outwardly directed splines on the selector sleeve, such splines being in engagement with the splines at the bore of the driver.

8. A change-speed gear assembly as claimed in claim 7 wherein a lost-motion is introduced between the outwardly directed splines on the selector sleeve and the internal splines to the driver, the tails being abutted in the forward drive conditions of the driver and selector and thus the pawl tripped.

References Cited by the Examiner
UNITED STATES PATENTS

| | | | |
|---|---|---|---|
| 942,520 | 12/1909 | Rockwell | 192—6 |
| 994,359 | 6/1911 | Archer | 192—6 |
| 1,277,070 | 8/1918 | Harrison | 74—750 |
| 2,857,785 | 10/1958 | Schwerdhofer | 74—781 |
| 2,953,945 | 9/1960 | Gleasman | 74—750 |
| 3,102,436 | 9/1963 | Schuller | 74—750 |

DAVID J. WILLIAMOWSKY, *Primary Examiner.*

DON A. WAITE, *Examiner.*

T. C. PERRY, *Assistant Examiner.*